Aug. 3, 1954   E. R. PRICE   2,685,171
POWER-ASSISTED MASTER CYLINDER
Filed Nov. 21, 1950
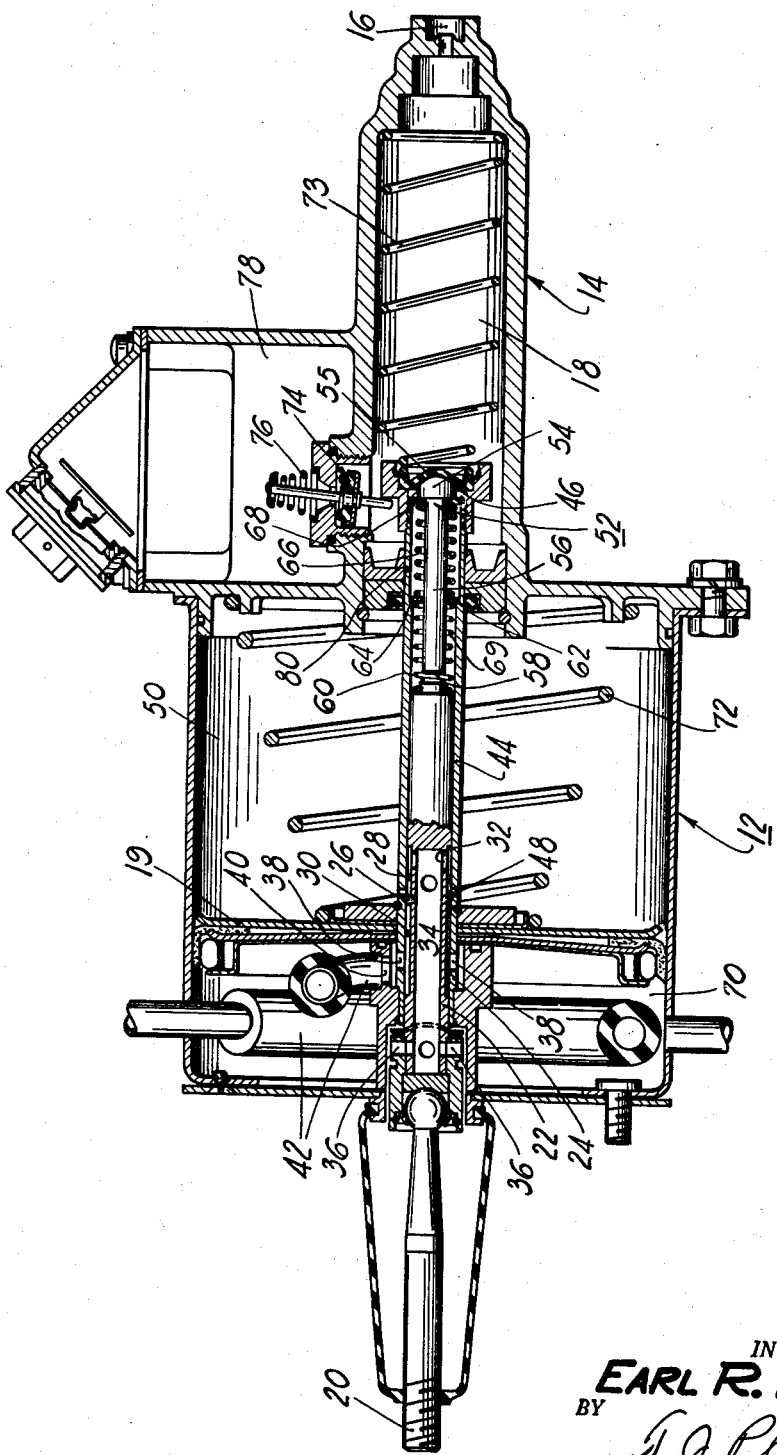
INVENTOR.
EARL R. PRICE
BY
T. J. Plante
ATTORNEY Patented Aug. 3, 1954

2,685,171

UNITED STATES PATENT OFFICE 2,685,171

POWER-ASSISTED MASTER CYLINDER

Earl R. Price, South Bend, Ind., assignor to Bendix Aviation Corporation, South Bend, Ind., a corporation of Delaware Application November 21, 1950, Serial No. 196,854

13 Claims. (Cl. 60—54.6)

This invention relates to a power-assisted master cylinder, i. e., a hydraulic pressure producing device in which physical operating force is supplemented by power assistance. The device is intended primarily as an actuator for a vehicle brake system, although other uses are possible.

In application Serial No. 110,816, filed August 17, 1949, now abandoned, I disclosed a power-assisted master cylinder having two coaxial plunger, or piston, members adapted to concurrently displace liquid from the pressure chamber of the master cylinder, one of said members being moved by the power cylinder piston and the other of said members being moved by the force exerted by the operator. The present invention provides an improved device of the type disclosed in my prior application.

The primary object of the present invention is to improve the "feel", or reaction, characteristics of the power-assisted master cylinder. This is accomplished by incorporating in the device suitable means for preventing the reaction member from exerting an appreciable reaction force during the initial portion of the brake-applying stroke. The pressure required to initiate braking action is kept as low as possible, subject to the limitation that only a slight deceleration should occur before the reaction member becomes effective. In other words, the initial treadle pressure is low, so that the weight of the operator's foot can, of itself, cause the shoes to take up a substantial amount of the shoe-to-drum clearance, before the reaction build-up begins. The initial lack of reaction force, followed by a normal reaction build-up as the retarding torque is developed, provides, in effect, a "two-stage" reaction which gives the operator a correct, and at the same time pleasant, "feel" indicative of the progress of the brake application.

An additional object of this invention is to incorporate in a power-assisted master cylinder, a counter reaction means and reaction transmitting member which cooperate with a pressure-transmitting member operatively associated with a manually actuated valve control member and movable wall in said power-assisted master cylinder, so that reaction resulting from fluid pressure in said master cylinder is not immediately transmitted to the operator of the manually actuated control member.

The above and other objects and features of the invention will appear more fully hereinafter from a consideration of the following description, taken in conjunction with the accompanying drawing, wherein an embodiment of the invention is illustrated by way of example. In the drawing:

The figure is a central longitudinal sectional view through the power-assisted master cylinder unit, the working parts of the unit being shown in released position.

The power-assisted master cylinder unit comprises a power cylinder 12 and a master cylinder 14 mounted on the front end of the power cylinder. The rear of the power cylinder casing is adapted to be mounted on the underside of a vehicle toeboard. The front end of the hydraulic cylinder has a discharge port 16 which is adapted to be connected, through suitable conduits, to one or more hydraulically actuated motors, such as the wheel cylinders of a vehicle braking system.

Inside hydraulic cylinder 14 is a pressure chamber 18, wherein the operating pressure for the wheel cylinders is developed jointly by the force exerted by power cylinder piston 19 and the force exerted by the operator through rod 20, which is adapted to be connected to a conventional foot-operated treadle. The right end of rod 20 is connected to a valve control member 22, preferably by a ball-and-socket joint, as shown.

Valve control member 22 is reciprocably associated with power piston 19, and is arranged to control operation of the power piston. Valve control member 22 is slidably mounted in a sleeve 24 which extends rearwardly from the power piston. The valve control member is illustrated as a cylindrical sliding valve, having an annular land 26 which separates an atmosphere space 28 from a vacuum space 30. Atmosphere space 28 is open to air at normal pressure through ports 32, the hollow center 34 of the valve control member, and ports 36. Vacuum space 30 is connected to the intake manifold of the vehicle (or to a vacuum pump) through ports 38 and 40, and flexible conduit 42.

A pressure-transmitting member 44 is secured to power piston 19 and has an annular liquid-displacing portion 46 located in hydraulic pressure chamber 18. In the illustrated design, the tubular portion of the pressure-transmitting member which extends from the power cylinder into the hydraulic pressure chamber also extends through the power piston to provide the sleeve 24 in which valve control member 22 is slidably mounted. Ahead of power piston 19, pressure-transmitting member 44 is provided with ports 48 which permit communication between chamber 50 of the power cylinder and the interior of the pressure-transmitting tube.

A reaction plunger 52 is reciprocably mounted inside the forward portion of the annular pressure-transmitting member 44. The reaction plunger has a head 54 which engages a diaphragm sealing member 55 and which is acted on by the pressure in hydraulic pressure chamber 18; and a stem 56, having a rear surface 58 which is slightly spaced in released position, from the front surface 60 of valve control member 22, as shown. A metal washer 62 is held against a shoulder 64 provided inside annular member 44. Washer 62 is engaged by one end of a coil spring 66, the other end of which engages a metal washer 68, which in turn engages the head 54 of the reaction plunger. Washer 62 and shoulder 64 provide a fixed internal flange which absorbs all of the reaction force of spring 66 until surface 60 of the valve control member engages surface 58 of the reaction plunger. Spring 66 thus serves as a "counter-reaction" device which prevents the reaction plunger from exerting an appreciable reaction force on the valve control member during the initial portion of the pressure stroke.

Operation of the power-assisted master cylinder is as follows: When the operator presses on the treadle, he moves rod 20 and valve control member 22 toward the right, against the resistance of a light valve return spring 69. Land 26 first cuts off communication between atmosphere space 28 and chamber 50 of the power cylinder, and thereafter connects the vacuum space 30 to chamber 50. As air is evacuated from chamber 50, a pressure differential is developed between chambers 50 and 70, the latter being open to air at atmospheric pressure.

The pressure differential acting on power piston 19 compresses return spring 72 and moves pressure-transmitting member 44 toward the right, displacing fluid from hydraulic pressure chamber 18 to the wheel cylinders (valve 74 having been seated by spring 76 during the initial movement of pressure-transmitting member 44, thereby cutting off communication between pressure chamber 18 and reservoir chamber 78).

The volume of fluid displaced from hydraulic pressure chamber 18, for a given length of stroke, depends on the diameter of the opening 80 through which pressure-transmitting member 44 extends into chamber 18. Part of the displacement is attributable to the head 54 of reaction plunger 52, which is subjected to the pressure of the fluid in chamber 18. The fluid pressure against the reaction plunger acts on spring 66, tending to compress it against shoulder 64.

Until the force developed by the reaction pressure against plunger 52 is sufficient to overcome counter-reaction spring 66, the plunger 52 does not exert a reaction force against the operator of the vehicle. The initial increment of reaction force is neutralized by being transmitted through spring 66 to pressure-transmitting member 44. In order to obtain the most satisfactory "feel," from a practical standpoint, I prefer to use a counter-reaction spring having a strength which permits the weight of the operator's foot to overcome most, or all, of the shoe-to-drum clearance, without, however, obtaining a heavy deceleration effect until the reaction build-up has begun. It is desirable to keep the initial treadle pressure as low as possible, but a definite reaction should be felt when the vehicle attains a deceleration rate caused by appreciable braking torque, in order to prevent over-braking. At the end of the initial low-treadle-pressure stage, the reaction force on plunger 52 compresses spring 66 sufficiently to bring surface 58 of the plunger into engagement with surface 60 of the valve control member. Further increases of pressure against plunger 52 are accompanied by increases in the reaction force which acts against the operator, and which must be overcome by the operator in order to intensify the brake applying pressure. The "two-stage" reaction provides a "feel" similar to that encountered in the best-designed physically-operated braking systems, in which the initial pedal force required to overcome the brake return springs is very light in relation to the pedal force required to stop the vehicle.

The control valve has the usual follow-up action, since valve member 22 slides in a sleeve which moves with power piston 19. As the power piston moves on its pressure stroke, it tends to overtake, and "lap," the valve control member, unless brake applying movement of the treadle continues. Whenever the operator removes his force from the treadle, the control valve member is pushed back by return spring 69 to the position in which chamber 50 communicates with the atmosphere, and springs 72 and 73 are able to return the power piston 19 and the fluid-displacing members 54 and 46 to retracted position.

In the foregoing specification and in the appended claims, the identifying terms used are intended to convey meanings which include the range of equivalent elements. For example, the term "power cylinder" is intended to mean any casing or chamber having a pressure responsive movable member therein, whether such movable member be a piston, or diaphragm, or something else having the same function. The words "front" and "rear," and other directional words, are intended to have only relative connotation, for convenience in describing, and are not intended to be interpreted as requiring any particular orientation with respect to external elements.

Although a particular embodiment of my invention has been described, it will be understood by those skilled in the art that the objects of the invention may be attained by the use of construction different in certain respects from that disclosed without departing from the underlying principles of the invention.

I claim:

1. A hydraulic pressure producing device, in which physical force is supplemented by power assistance, comprising a differential air pressure power cylinder, a hydraulic cylinder mounted on one end of the power cylinder and having a pressure chamber which is provided with a discharge port, a pressure-responsive movable wall in the power cylinder, a pressure-transmitting member secured at one end to the movable wall and extending at the other end into the hydraulic pressure chamber, an operator operated valve control member slidably mounted inside the pressure-transmitting member, a plunger member movable inside the pressure-transmitting member and having a stem, the end of which is normally spaced slightly from the end of the valve control member, and a head which is in the hydraulic pressure chamber, the head of the plunger member and the portion of the pressure-transmitting member inside the hydraulic pressure chamber being arranged to jointly displace fluid from said chamber, an internal flange carried by the pressure-transmitting member between the ends of the plunger stem, a valve return spring compressed between one side of the flange and the valve control member, and a counter-reaction spring which engages the other side of the flange and the plunger head and which tends to hold the plunger away from the valve control member.

2. A hydraulic pressure producing device, in which physical force is supplemented by power assistance, comprising a differential air pressure power cylinder, a hydraulic cylinder mounted on one end of the power cylinder and having a pressure chamber which is provided with a discharge port, a pressure-responsive movable wall in the power cylinder, a pressure-transmitting member secured at one end to the movable wall and extending at the other end into the hydraulic pressure chamber, an operator operated valve control member slidably mounted inside the pressure-transmitting member, a plunger member movable inside the pressure-transmitting member and having a stem, the end of which is normally spaced slightly from the end of the valve control member, and a head which is in the hydraulic pressure chamber, the head of the plunger member and the portion of the pressure-transmitting member inside the hydraulic pressure chamber being arranged to jointly displace fluid from said chamber, an internal flange carried by the pressure-transmitting member, and a counter reaction spring which engages the flange and the plunger head and which tends to hold the plunger away from the valve control member.

3. A hydraulic pressure producing device, in which physical force is supplemented by power assistance, comprising a power cylinder, a hydraulic cylinder mounted on one end of the power cylinder and having a pressure chamber which is provided with a discharge port, a pressure-responsive movable wall in the power cylinder, a pressure-transmitting member acted on by the movable wall and having a fluid-displacing portion in the hydraulic pressure chamber, an operator operated valve control member reciprocably associated with the movable wall, a plunger member reciprocably mounted in the pressure-transmitting member and having a stem, the end of which is normally spaced slightly from the end of the valve control member, and a head which is in the hydraulic pressure chamber, the head of the plunger member and the fluid-displacing portion of the pressure-transmitting member being arranged to jointly displace fluid from the hydraulic pressure chamber, an internal flange in the pressure-transmitting member, and a counter reaction spring which engages the flange and the plunger head and which tends to hold the plunger away from the valve control member.

4. A hydraulic pressure producing device, in which physical force is supplemented by power assistance, comprising a power cylinder, a hydraulic cylinder mounted on one end of the power cylinder and having a pressure chamber which is provided with a discharge port, a pressure-responsive movable wall in the power cylinder, a pressure-transmitting member acted on by the movable wall and having a fluid-displacing portion in the hydraulic pressure chamber, a valve control member reciprocably associated with the movable wall, a plunger member reciprocably mounted in the pressure-transmitting member and having one end near the end of the valve control member and the other end in the hydraulic pressure chamber, the plunger member and the fluid-displacing portion of the pressure-transmitting member being arranged to jointly displace fluid from the hydraulic pressure chamber, an internal flange in the pressure-transmitting member, and a counter-reaction spring which engages the flange and the plunger and which tends to hold the plunger away from the valve control member.

5. A hydraulic pressure producing device, in which physical force is supplemented by power assistance, comprising a power cylinder, a hydraulic cylinder at one end of the power cylinder, a pressure-responsive movable wall in the power cylinder, a pressure-transmitting member acted on by the movable wall and having a fluid-displacing portion in the hydraulic cylinder, a valve control member reciprocably associated with the movable wall, a reaction plunger reciprocably mounted in the pressure-transmitting member and having one end adapted to engage the valve control member and the other end subjected to the pressure in the hydraulic cylinder, and resilient means which tends to hold the reaction plunger away from the valve control member and which neutralizes part of the reaction by transferring it to the movable wall.

6. A hydraulic pressure producing device comprising a power cylinder, a hydraulic cylinder, a pressure-responsive movable wall in the power cylinder, a pressure-transmitting member acted on by the movable wall and having a fluid-displacing portion in the hydraulic cylinder, a valve control member which controls operation of the movable wall, a reaction plunger having one end adapted to engage the valve control member and the other end subjected to the pressure in the hydraulic cylinder, and resilient means which tends to hold the reaction plunger away from the valve control member and which neutralizes part of the reaction by transferring it to the movable wall.

7. A hydraulic pressure producing device comprising a power cylinder, a hydraulic cylinder, a pressure-responsive movable wall in the power cylinder, a pressure-transmitting member acted on by the movable wall and having a fluid-displacing portion in the hydraulic cylinder, a valve control member which controls operation of the movable wall, a reaction plunger having one end adapted to exert force on the valve control member and the other end subjected to the pressure in the hydraulic cylinder, and means for withholding at least part of the reaction effect of the reaction plunger during the initial portion of the applying stroke.

8. A hydraulic pressure producing device comprising a power cylinder, a hydraulic cylinder, a pressure-responsive movable wall in the power cylinder, a pressure-transmitting member acted on by the movable wall and having a fluid-displacing portion in the hydraulic cylinder, a valve control member which controls operation of the movable wall, a reaction plunger having one end adapted to act on the valve control member and the other end subjected to the pressure in the hydraulic cylinder, and two springs, one of said springs serving to hold the reaction plunger away from the valve control member and to neutralize part of the reaction, and the other of said springs serving as a return spring for the valve control member.

9. A hydraulic pressure producing device comprising a power cylinder, a hydraulic cylinder, a pressure-responsive movable wall in the power cylinder, a pressure-transmitting member acted on by the movable wall and having a fluid-displacing portion in the hydraulic cylinder, a valve control member which controls operation of the movable wall, a reaction plunger having one end adapted to act on the valve control member and the other end subjected to the pressure in the hydraulic cylinder, and two successively operable springs, one of said springs serving to hold the reaction plunger away from the valve control member and to neutralize part of the reaction, and the other of said springs serving as a return spring for the valve control member.

10. A hydraulic pressure producing device comprising a power cylinder, a hydraulic cylinder, a pressure-responsive movable wall in the power cylinder, a pressure-transmitting member acted on by the movable wall and having a fluid-displacing portion in the hydraulic cylinder, a valve control member which controls operation of the movable wall, a reaction member having a portion thereof adapted to act on the valve control member and another portion thereof subjected to the pressure in the hydraulic cylinder, and means, including a plurality of springs, for controlling the operation of the valve control member and reaction member, one of said springs serving to hold the reaction member away from the valve control member and to neutralize part of the reaction, and the other of said springs serving to control the operation of the valve control member.

11. A hydraulic pressure producing device comprising a power cylinder, a hydraulic cylinder, a pressure-responsive movable wall in the power cylinder, a pressure-transmitting member acted on by the movable wall and having a fluid-displacing portion in the hydraulic cylinder, a manually-operable control member for controlling the operation of the movable wall, a reaction member subject to the pressure developed in said hydraulic cylinder for transmitting a proportional reaction force to said manual control member, and means for withholding at least part of the reaction effect of the reaction member until a predetermined pressure has developed in the hydraulic cylinder.

12. In a hydraulic pressure producing device comprising a power cylinder, a hydraulic cylinder, a pressure-responsive movable wall in the power cylinder, a pressure-transmitting member acted on by the movable wall and having a fluid-displacing portion in the hydraulic cylinder, a manually-operable control member for controlling the operation of the movable wall, a reaction member exposed to the pressure in said hydraulic cylinder and movable to transmit a reaction force as a function of the pressure developed in the said hydraulic cylinder to said manual control member, means normally maintaining said reaction member out of operative engagement with said manual control member, said latter means being yieldable and having an operative connection with said pressure-transmitting member to transmit a predetermined amount of the initial reaction force to said movable wall.

13. A hydraulic pressure producing device comprising a power cylinder, a hydraulic cylinder, a pressure-responsive movable wall in the power cylinder, a pressure-transmitting member acted on by the movable wall and having a fluid-displacing portion in the power cylinder, a manually-operable control member for controlling the operation of the movable wall, a reaction member supported by said pressure-transmitting member and having a portion exposed to the pressure of the fluid in said hydraulic cylinder, and yieldable counter-reaction means normally maintaining said reaction member out of operative engagement with said manual control member, said yieldable means being effective to absorb a predetermined amount of the initial reaction force and transfer it to the movable wall, following which said reaction member becomes effective to transmit the full reaction force to said control member.

References Cited in the file of this patent

UNITED STATES PATENTS

| Number | Name | Date |
| --- | --- | --- |
| 2,006,487 | Sorensen | July 2, 1935 |
| 2,451,334 | Groves | Oct. 12, 1948 |